United States Patent [19]
Lin et al.

[11] Patent Number: 5,690,432
[45] Date of Patent: Nov. 25, 1997

[54] MEAN AXIS OF BICYCLE

[76] Inventors: Jing-Chen Lin, No. 173, Kuei Suei St.;
Ming-Chang Lin, No. 66, Huai An St.,
both of Kaohsiung City, Taiwan

[21] Appl. No.: 791,361

[22] Filed: Jan. 30, 1997

[51] Int. Cl.[6] .................................................. F16C 19/08
[52] U.S. Cl. ........................................................ 384/545
[58] Field of Search ........................................ 384/545, 540,
384/538, 519, 537

[56] References Cited

U.S. PATENT DOCUMENTS

| | | | |
|---|---|---|---|
| 5,181,437 | 1/1993 | Chi | 384/545 |
| 5,233,885 | 8/1993 | Lin et al. | 384/545 |
| 5,460,455 | 10/1995 | Chen | 384/545 |

*Primary Examiner*—Lenard A. Footland
*Attorney, Agent, or Firm*—Morton J. Rosenberg; David I. Klein

[57] ABSTRACT

The present invention provides a mean axis of bicycle, which includes a five-way pipe, an internal pipe, an axle, two setting rings, two ball housings and two ball bearings. Wherein the inside walls at both ends of the internal pipe and the outside walls of the two ball housings are turned threads separately, and one ball housing has a ring shoulder at the middle position of the thread. Thereby the two ball housings fixed one ball bearing, the axle and another ball bearing in the internal pipe respectively with the outside threads to form a mean axis assembly. Then the two setting rings fix the mean axis assembly in the five-way pipe from both sides by connecting to the ball housings of the mean axis assembly in thread joint, and to the five-way pipe in bell and spigot joint. When turning the setting rings in or out from both sides of the five-way pipe, the axle in the mean axis assembly can be moved from the right to left or from the left to right along the axis to make the master chain wheel set keep in an allowable range with the rare sprocket set.

1 Claim, 7 Drawing Sheets

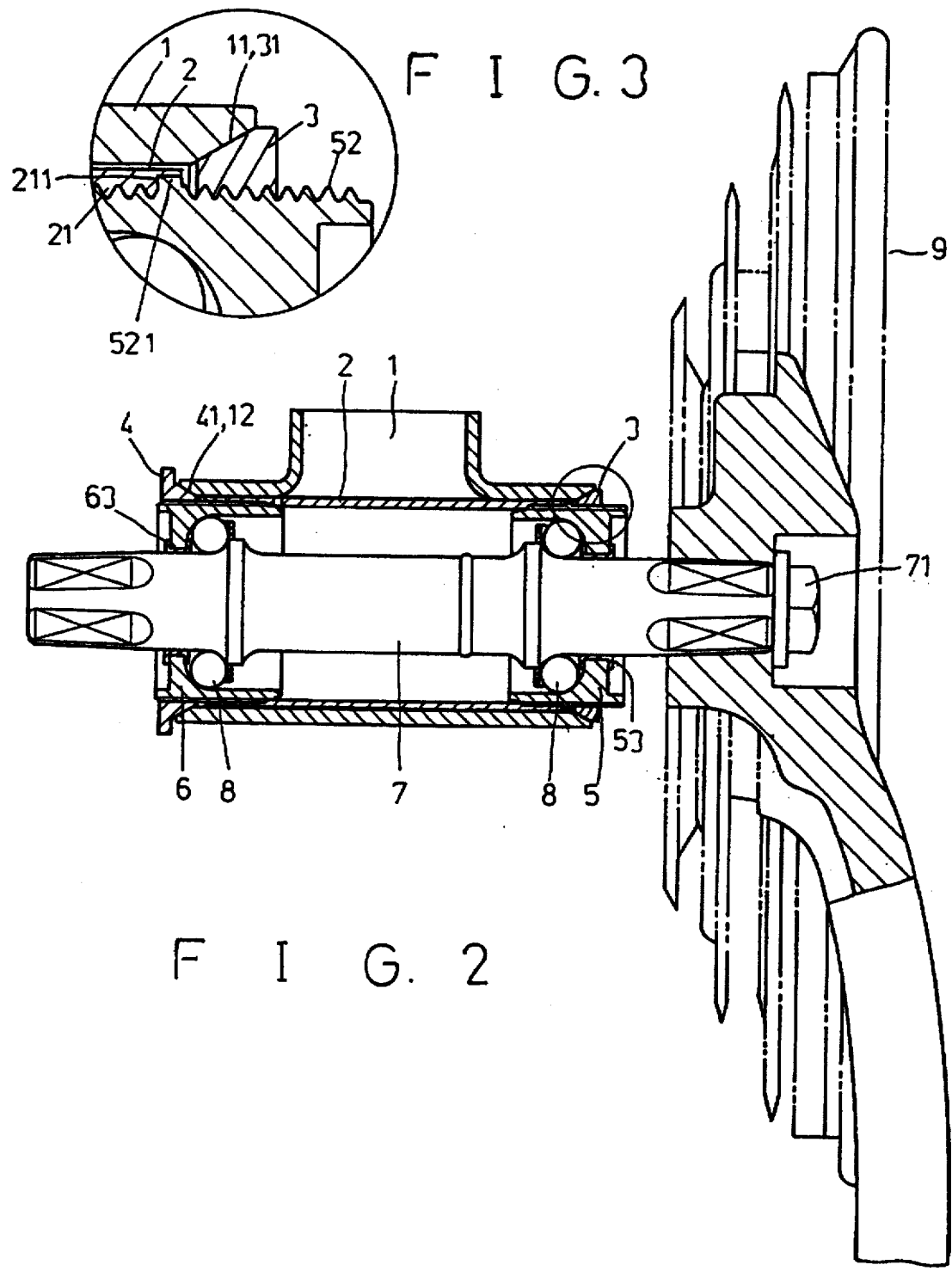

5,690,432

MEAN AXIS OF BICYCLE

BACKGROUND OF THE INVENTION

(1) Field of the Invention

The present invention relates to a mean axis of bicycle, and more particularly to an independent assembly which is able to adjust the position on a five-way pipe.

(2) Description of Prior Art

In accordance with the conventional mechanism of a mean axis of bicycle, as shown in FIG. 7, a five-way pipe is formed with inner threads at both gates pre-welded on the frame of the bicycle. The set-up procedure is to be done in the manufacturer production-line, so all parts such as, axle, ball and so on, have to be conveyed to the production-line and installed sequentially, coordinating to the sprocket or sprocket set on the rear wheel, and adjusting the master chain wheel set to make the shifter work smoothly. The complicated works require much time and effort, and need the worker on the post who has special techniques. In this case, it often causes a bottleneck phenomenon in the production-line, and changing worker will bring up the production-line stagnating.

For this sake, a new independent mean axis assembly were developed later, as shown in FIG. 8, this newer design has all parts of the mean axis to be assembled in an internal pipe at one place other than the production-line to form an independent assembly. So in the production-line, the mean axis assembly only doing the installed in the five-way pipe with a simple processing, the fabrication of the mean axis can be finished on the production-line. But this mechanism, as shown in FIG. 8, has still existed some shortcomings as following.

1. The mean axis assembly is installed in the five-way pipe in advance, the oversize caused by part production and the assembling will make the shifter out of work, even a batch of the mean axis assemblies has to be returned for repair. If the repair can not correct the error, they will have to be throwaway which causes great loss to the factory.

2. There are many manufacturers who produce master chain wheel set and each has a different allowable tolerance of the mean axis assembly, hence just one size of above-mentioned product is unable to meet all requirements.

OBJECTS AND SUMMARY OF THE INVENTION

It is therefore one object of this invention to provide an independent mean axis assembly in which the position of the axle in the five-way pipe is adjustable to fit different requirement of allowable tolerance.

The present invention includes a five-way pipe, an internal pipe, an axle, two setting rings, two ball housings and two ball bearings. Wherein the inside walls at both ends of the internal pipe and the outside walls of the two ball housings are formed with threads respectively, and one ball housing has a ring shoulder at middle position of the thread. Thereby the two ball housings fixed a ball bearing, the axle and another ball bearing in the internal pipe respectively with the outside threads to form a mean axis assembly. Then the two setting rings secure the mean axis assembly in the five-way pipe from both sides by connecting to the ball housings of the mean axis assembly in thread joint, and to the five-way pipe in bell and spigot joint. When turning the setting rings in or out from both sides of the five-way pipe, the axle in the mean axis assembly can be moved either from the right to the left or from the left to the right along the axis to adjust the master chain wheel set in an allowable range with the rare sprocket set.

BRIEF DESCRIPTION OF THE DRAWINGS

FIG. 2 is a cross-section view of the present invention installed on a sprocket;

FIG. 3 is an enlarged section view of numerical 3 in FIG. 2 of the present invention;

DETAILED DESCRIPTION OF PREFERRED EMBODIMENTS

Figure 1:
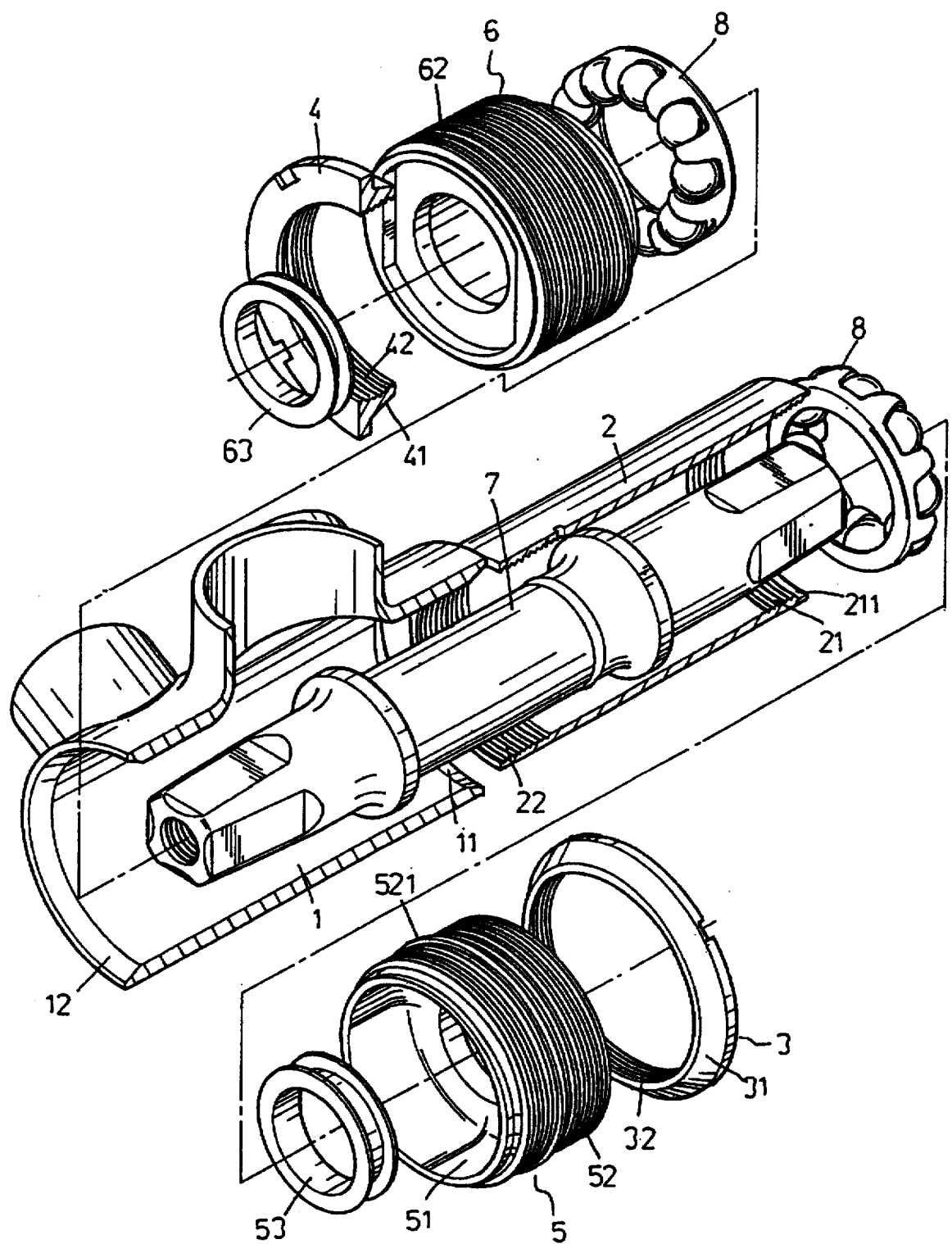
FIG. 1 is an exploded view of the present invention.

Referring to FIG. 1, the present invention includes a five-way pipe 1, an internal pipe 2, two setting rings 3 4, two ball housing 5 6, an axle 7 and two ball bearings 8, and cooperating with a master chain wheel set 9 in practising.

The five-way pipe 1 has two conic surfaces 11 12 formed at insides of two ends respectively.

The internal pipe 2 is formed with two inside threads 21 22 at both ends, and a collar step opening 211 at one end.

The setting ring 3 or 4 have two conic surfaces 31 or 41 formed at one outer end of each ring as a spigot corresponding to the conic surfaces 11 12 of the five-way pipe 1, and threaded holes 32 or 42.

The ball housings 5 or 6 have a ball track 51 or 61 formed at one inner end of each housing, and threads 52 or 62 surrounding the outside surface; the ball housing 5 has a ring shoulder 521 at the middle position of the thread 51 corresponding to the collar step opening 211 of the internal pipe 2; and two ring seals 53 and 63 can be embedded into the inner portions of the ball housings 5 and 6 individually.

Figure 4:
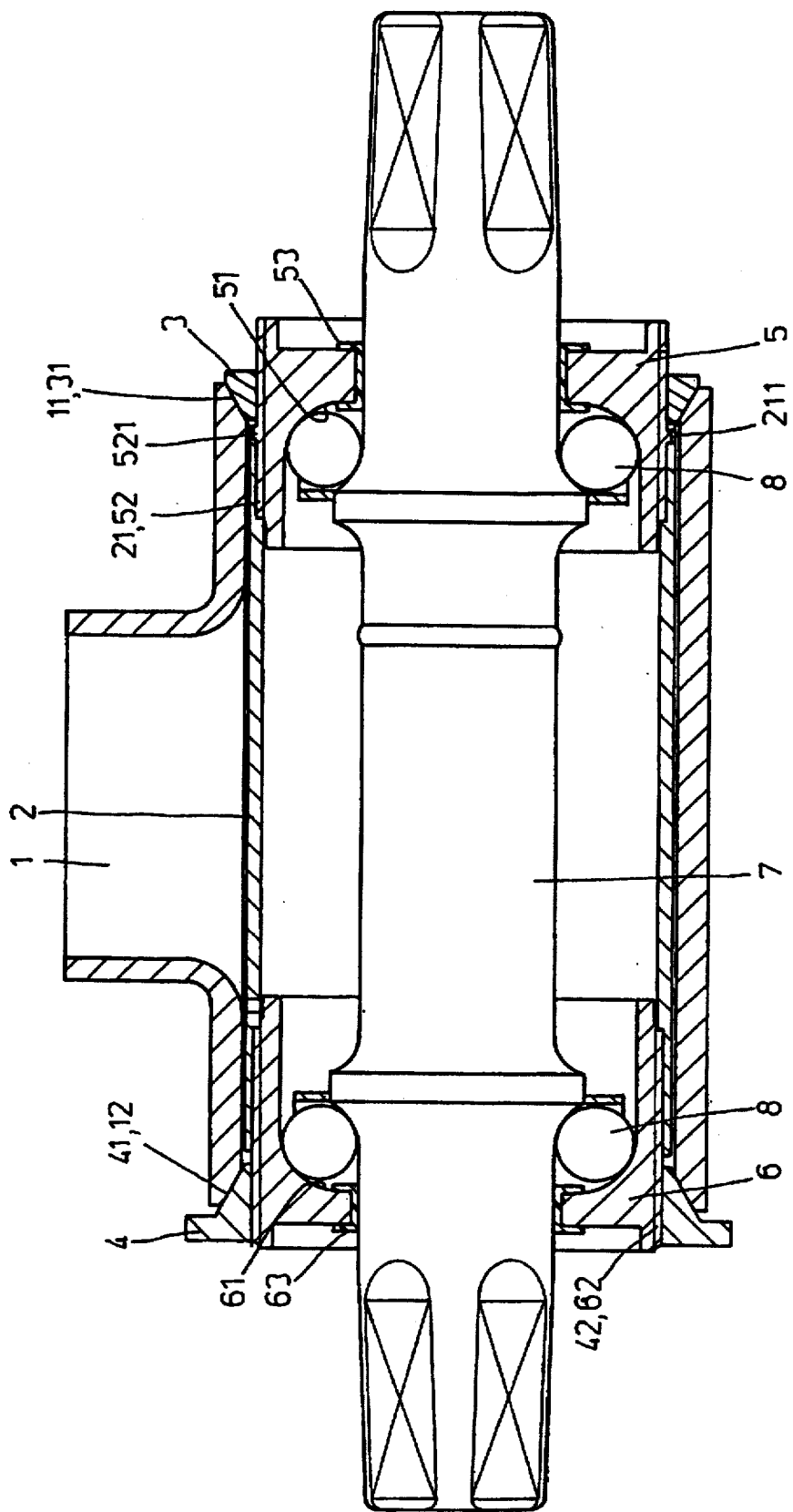
FIG. 4 is a cross-section view showing adjusting processing of the present invention (A)
Figure 5:
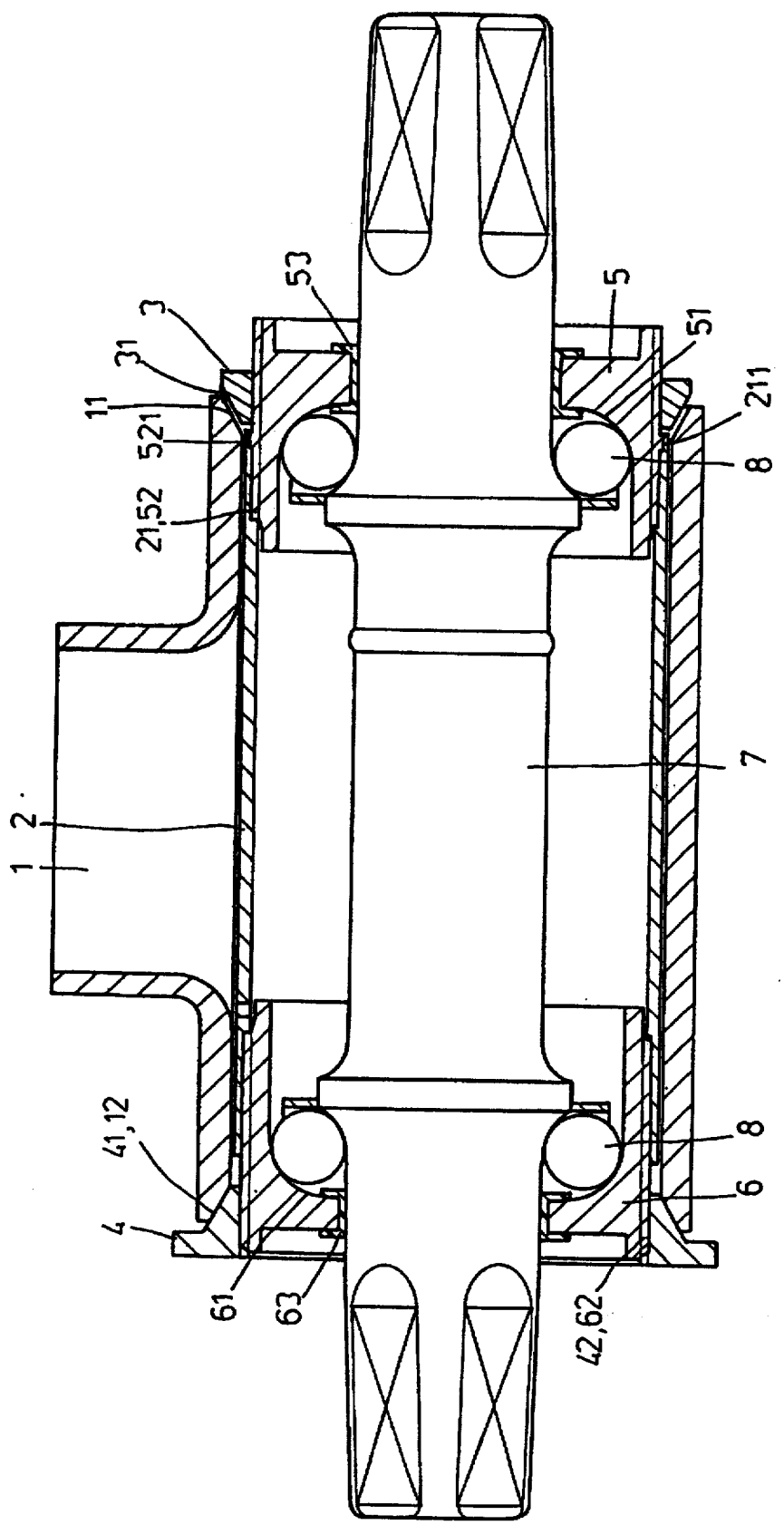
FIG. 5 is a cross-section view showing adjusting processing of the present invention (B)
Figure 6:
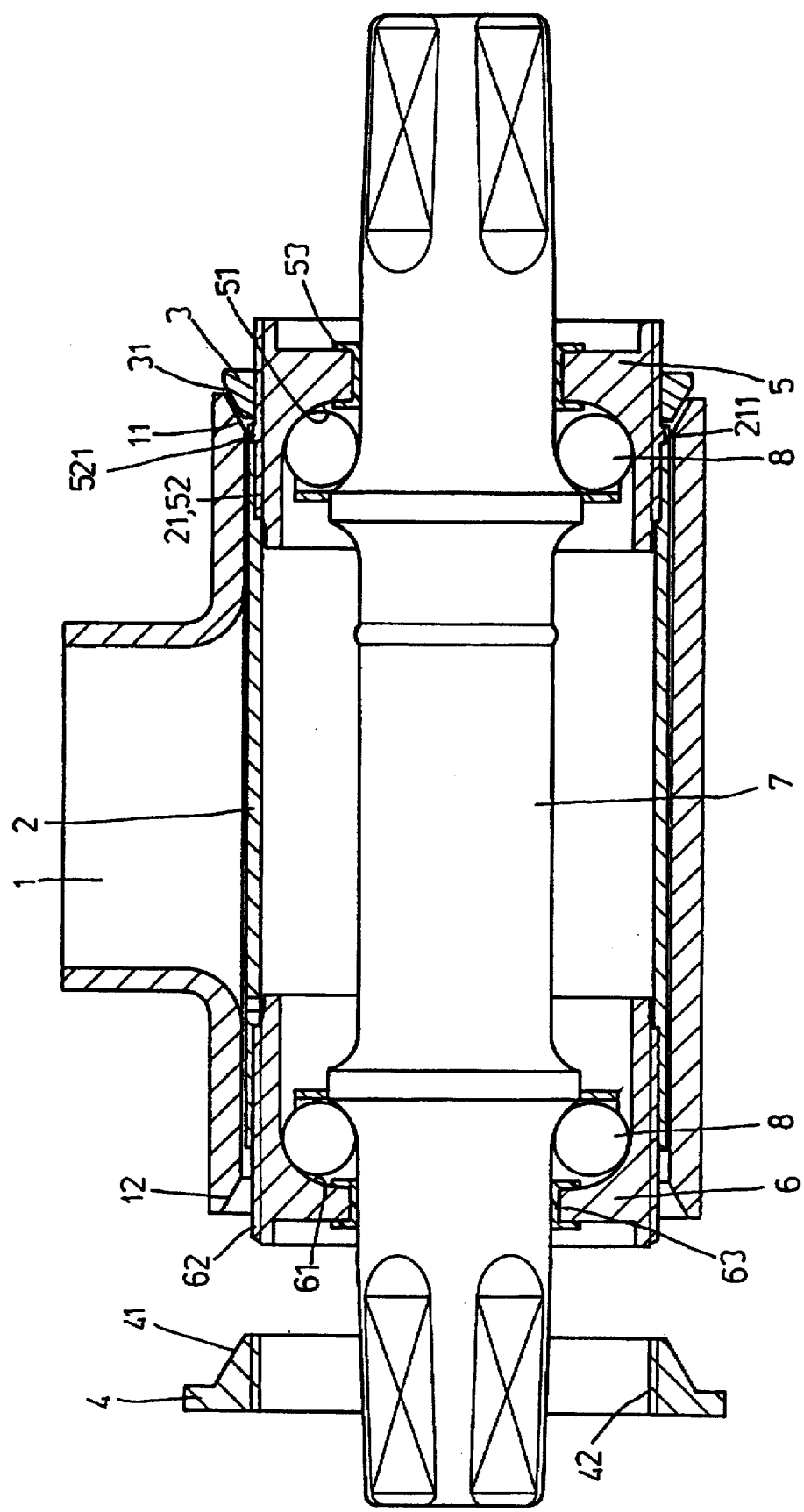
FIG. 6 is a cross-section view showing adjusting processing of the present invention (C)
Figure 7:
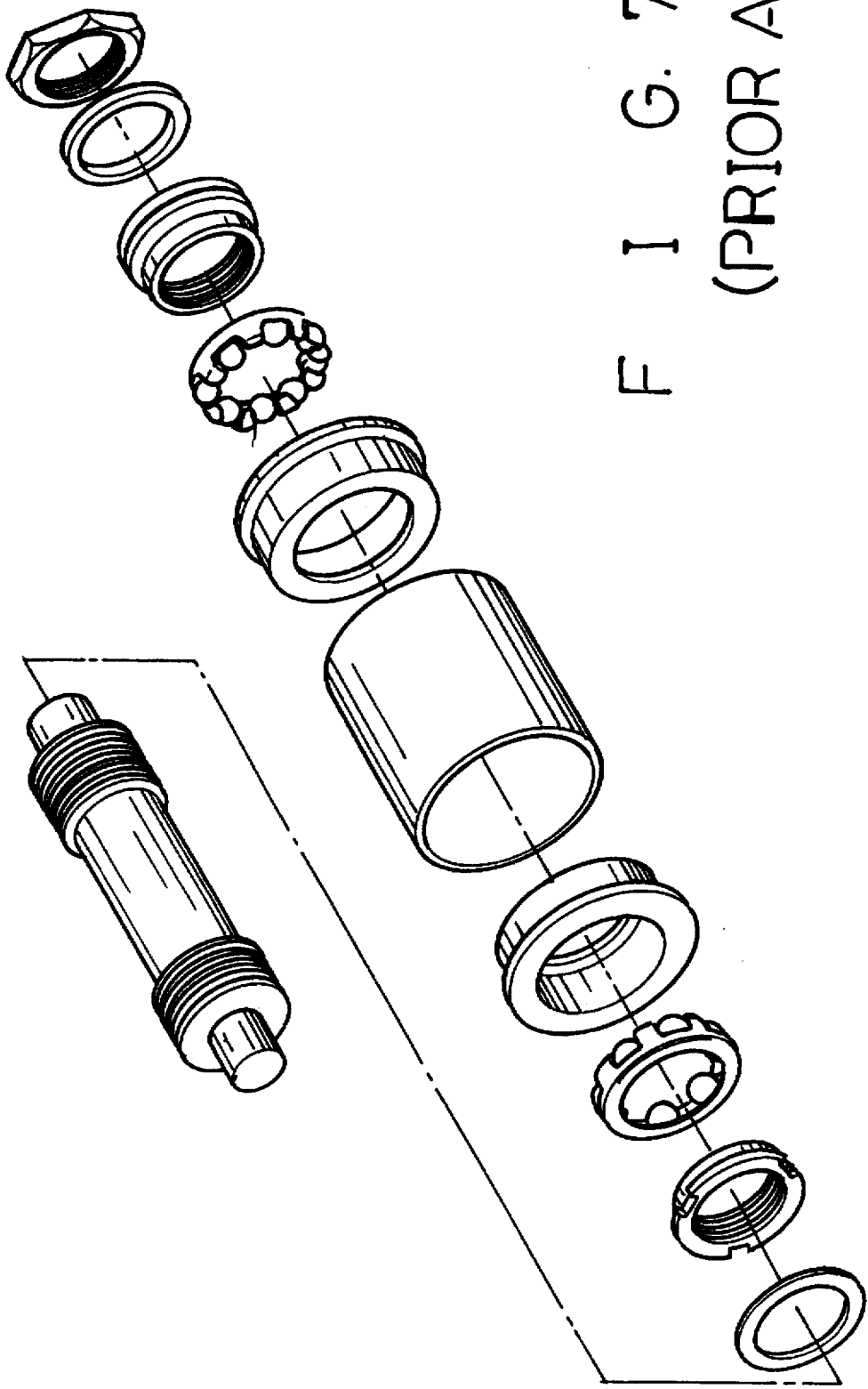
FIG. 7 is an exploded view of a prior art.
Figure 8:
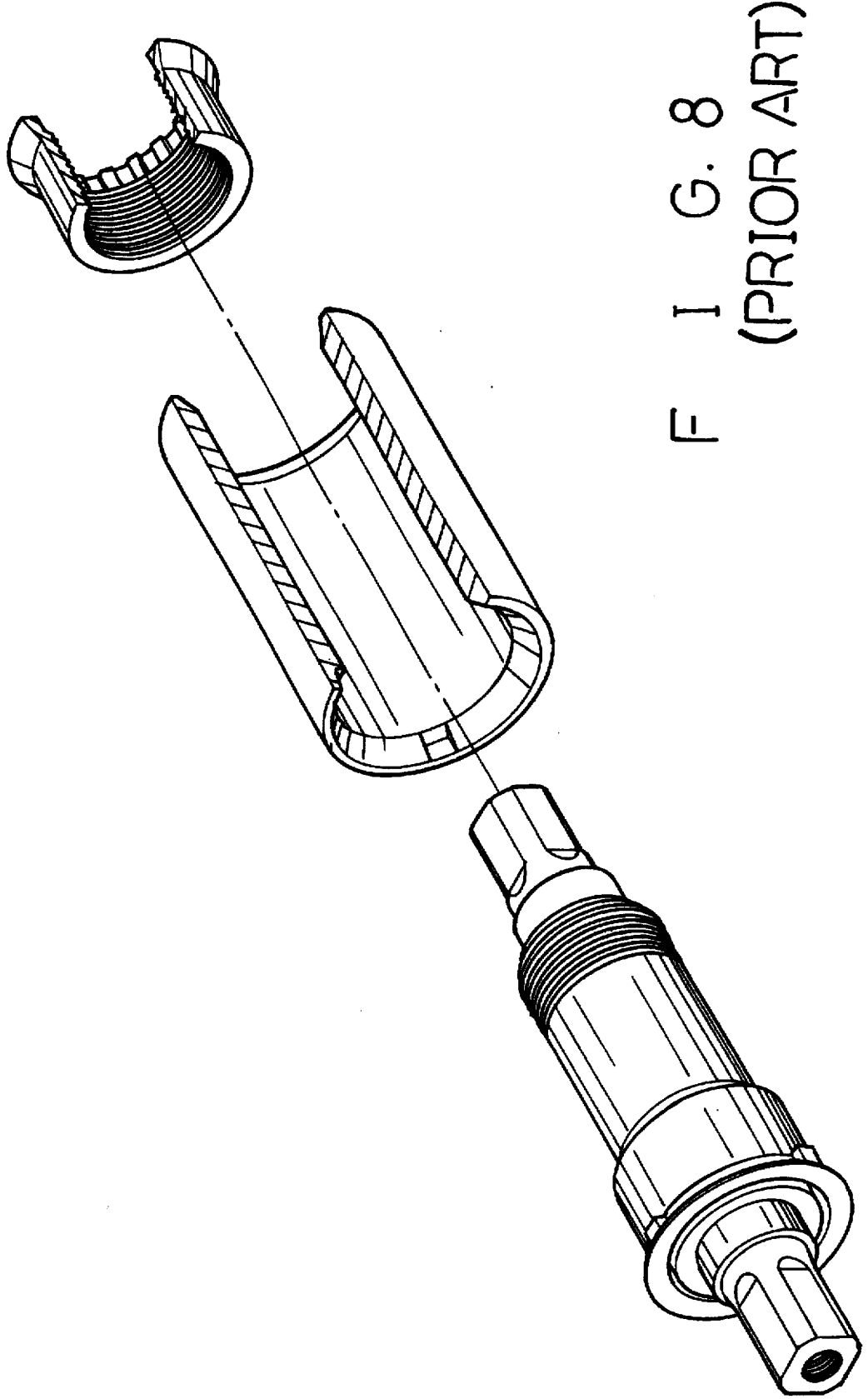
FIG. 8 is an exploded view of another prior art.

In assembling, referring to FIG. 2 and FIG. 3, insert the thread end 52 of the ball housing 5 into one end of the internal pipe 2 until the ring shoulder 521 blocks the step opening 211 of the internal pipe 2, place the ball bearing 8 and the axle 7 in the internal pipe 2 respectively with the axle 7 urging the ball bearing 8 against the ball track 52. Then the other ball housing 6 is threaded in the internal pipe 2 which allows the ball bearing 8 to seat in the ball track 61 as well. This has completed the assembling of the mean axis assembly. The only job for the worker in the production-line is to mount the assembly in the five-way pipe 1. First, thread the setting ring 3 on one ball housing 5 or 6 of the mean axis assembly and insert the free end of the assembly into the five-way pipe 1 until the conic surface 31 touching against the conic surface 11 of the five-way pipe 1, lastly in the same way, thread the setting ring 4 from the other side of the ball housing 5 or 6 so that the mean axis assembly is fixed in the five-way pipe 1, in this case, the inner ends of the setting rings 3 4 remain a small gap at both ends of the internal pipe for adjusting the position of the axle 7 in the five-way pipe 1. Therefore, the master chain wheel set 9 can be fixed on the end of the axle 7 by a bolt 71. If the master chain wheel set 9 is out of allowable range according to the rear sprocket set, referring to FIG. 4 to FIG. 6, threading the setting rings 3 and 4 outward and inward separately to adjust the axle 7 shifting left-right position to move in the allowable range. For instance, threading the setting ring 3 outward and the setting ring 4 inward, the axle 7 moves to the left position, then threading the setting rings 3 and 4 to the other direction should make the axle towards the right position. In this way, adjusting the position of the axle 7 so that the mean axis can fit different master chain wheel set.

I claim:

1. A mean axis of bicycle comprising a five-way pipe, an internal pipe, two setting rings, two ball housings, an axle and two ball bearing, and cooperating with a master chain wheel set in practising; and the improvements comprising:

said five-way pipe comprising two conic surfaces at respective inner ends thereof;

said internal pipe comprising two threads at respective inner ends thereof;

said setting rings comprising a conic surface formed at an outer end as a spigot corresponding to said conic surfaces of said five-way pipe, and an inner threaded hole from the other end;

said ball housings comprising a ball track at an inner end, thread surrounding over the outside surface, and a ring seal embedded into said ball housings; wherein by threading said ball track end of said ball housing into one end of said internal pipe, one of said ball bearing, said axle and the other said ball bearing are inserted respectively from other side, then the last ball housing is threaded into the internal pipe from the other side so that the ball bearings seat in the ball tracks respectively to form a mean axis assembly; then inserting the combined mean axis assembly into the five-way pipe, and turning two setting rings from both sides of the five-way pipe so that the conic surfaces of the setting rings press against the conic surfaces of the five-way pipe tightly fix the mean axis assembly in the five-way pipe; making use of the gaps between the inner ends of the setting rings and both ends of the internal pipe, turning the setting rings out and in separately adjust the axle shift left-right to adjust the allowable range.

* * * * *